United States Patent
Oz et al.

(10) Patent No.: US 7,787,439 B1
(45) Date of Patent: Aug. 31, 2010

(54) METHOD AND SYSTEMS FOR PROVIDING ENHANCED TELEVISION SERVICES

(75) Inventors: Ran Oz, Modiin (IL); Tamir Tassa, Givatayim (IL)

(73) Assignee: Bigband Networks Inc., Redwood City, CA (US)

( * ) Notice: Subject to any disclaimer, the term of this patent is extended or adjusted under 35 U.S.C. 154(b) by 2155 days.

(21) Appl. No.: 10/187,917

(22) Filed: Jul. 1, 2002

Related U.S. Application Data

(63) Continuation-in-part of application No. 09/595,624, filed on Jun. 16, 2000, and a continuation-in-part of application No. 09/579,551, filed on May 26, 2000, now Pat. No. 6,434,141.

(60) Provisional application No. 60/324,763, filed on Sep. 21, 2001.

(51) Int. Cl.
*H04L 12/66* (2006.01)

(52) U.S. Cl. ...................................... 370/352; 348/474
(58) Field of Classification Search ....................... None
See application file for complete search history.

(56) References Cited

U.S. PATENT DOCUMENTS

| | | | | |
|---|---|---|---|---|
| 5,907,366 A | * | 5/1999 | Farmer et al. | 348/478 |
| 6,081,291 A | * | 6/2000 | Ludwig, Jr. | 348/14.11 |
| 6,868,550 B1 | * | 3/2005 | Hashimoto | 725/25 |
| 6,937,618 B1 | * | 8/2005 | Noda et al. | 370/486 |
| 7,187,686 B1 | * | 3/2007 | Walkoe et al. | 370/419 |

* cited by examiner

*Primary Examiner*—Phirin Sam
(74) *Attorney, Agent, or Firm*—Reches Patents

(57) ABSTRACT

A system and method for allowing an end-user to interact with a system in order to execute an application. Multiple digital service packets are broadcast to a plurality of end-users, such that the upstream transmission of data from end-users is greatly reduced. Each end-ser further receives media packets, whereas visual objects relating to the application can be displayed on an end-user display unit with visual objects originating from the media packets.

27 Claims, 8 Drawing Sheets

METHOD AND SYSTEMS FOR PROVIDING ENHANCED TELEVISION SERVICES

RELATED CASES

This patent application hereby claims the priority benefit of, incorporates by reference, and is a Continuation-In-Part of:
 (A) U.S. patent application Ser. No. 09/579,551, filed May 26, 2000 now U.S. Pat. No. 6,434,141; and
 (B) U.S. patent application Ser. No. 09/595,624, filed Jun. 16, 2000.

This patent application also incorporates by reference and claims the priority benefit of U.S. Provisional Patent Application No. 60/324,763 filed Sep. 21, 2001 and entitled "Method and system for providing enhanced television services".

FIELD OF THE INVENTION

The present invention relates to communication systems and methods in general, and to methods and systems for providing interactivity for end-users over digital broadcast channels, in particular.

BACKGROUND OF THE INVENTION

Digital channels and analog channels are provided to terminals, such as analog home communication terminals (AHCT) and digital home communication terminals (DHCT) via bandwidth limited communication channels like hybrid fiber coax (HFC) networks.

Analog channels are much more bandwidth consuming than digital channels. Nevertheless, cable operators are required to broadcast analog channels, as many end users have AHCTs only.

Digital television technology allows for exchanging information with end-users, such as end users that have a DHCT. Accordingly a variety of digital services, commonly referred to as interactive TV or enhanced TV, can be provided to an end user that has a DHCT.

Commonly, a single program must be broadcast in both an analog channel and a digital channel, for allowing its reception by AHCT and for providing digital services. This solution is bandwidth consuming, and limits the amount of services that can be provided to end users, in view of the limited bandwidth of existing cable networks such as HFC networks.

There is a need to provide a system and method for efficiently utilizing the bandwidth of cable systems.

There is a need to provide an efficient system and method for providing digital services to DHCT while providing programs to AHCTs.

SUMMARY OF THE PRESENT INVENTION

The invention provides a system and method for utilizing a portion of a display unit for displaying a digital representation of an analog channel while utilizing another portion of the screen for displaying digital services related items.

The invention provides a system and method for generating a digital representation of at least two analog programs, allocating for each digital representation of a single program a distinct portion of a display unit and displaying only a single representation. The single representation is displayed such that the display unit can also be utilized for digital services, such as interactive services.

The invention provides a system and method for combining digital representations of analog programs to provide a multiplexed digital sequence. The multiplexed digital sequence can be in a form of a mosaic such that each digital representation of an analog program is displayed on a different part of a display unit. According to an aspect of the invention the multiplexed digital sequence also includes at least one overlay layer for selectively "covering" all but a single selected digital representation of an analog program. The overlay layer can be further utilized to display text, images and/or messages related to a digital service such as an enhanced TV application.

The overlay layers can be generated by a central unit, such as an head-end or can be generated by DHCT in response to instruction code preferably embedded within media streams. The code can be transmitted in-band but can also be transmitted out of band.

The invention provides a system and method wherein the analog programs are divided to groups of four analog programs each. Each four analog programs of a group are fed via a combiner into a digital encoder, such as but not limited to MPEG compliant encoder. The digital encoder is operative to output a multiplexed digital sequence. The multiplexed digital sequence is received by a DHCT that includes a digital encoder, such as an MPEG decoder, that in response decodes the multiplexed digital sequence to provide a mosaic of four representations of four analog programs. Each representation of an analog program is destined to be displayed on a different portion of the TV screen. When an end user selects to view one of the four analog programs, he receives the analog program but when he selects to receive an enhanced TV service he receives the mosaic of four digital representations and an overlay layer that covers all but the selected program will be displayed on the TV screen. This overlay layer can further be utilized for digital services, such as interactive TV. Text and/or images related to the digital service may be displayed on top of the overlay layer.

The invention provides a system and method in which the overlay layer and text/images associated with digital services are generated as bitmaps and embedded within media packets. For example, if 6 mosaic programs at 4 Mbps each were multiplexed together into a 38.8 Mb/s channel, it would leave roughly 14 Mb/s for the bitmap data packets.

The invention provides a system and method in which analog programs are transmitted in parallel to the transmission of multiplexed digital sequences that include digital representations of these analog programs. The number of analog channels usually exceeds the number of digital channels that are utilized to convey the multiplexed digital sequences.

The invention provides a system and method in which a DHCT software and/or hardware component (also referred to "client") tunes the DHCT tuner to a digital channel that conveys a digital representation of the analog channel, in response to a selection of an enhanced TV service by the user, even if the end user was viewing the analog program itself.

The enhanced representations can be executed by selecting bitmaps out of a carousel of bit maps, as illustrated at U.S. patent application titled "a method for providing interactivity for end-users over digital broadcast channels" by Oz et al, which is incorporated in its entirety by reference. For example, an end-user can interact with a system in order to execute an application. Multiple digital service packets are broadcast to a plurality of end-users, such that the upstream transmission of data from end-users is greatly reduced. Each end-user further receives media packets, whereas visual objects relating to the application can be displayed on an end-user display unit with visual objects originating from the media packets.

The invention provides a system and method in which the digital services include various applications such as general-purpose applications that involve exchange of data between an end user and a service provider, such as but not limited to purchasing goods, ordering pizza, receiving weather reports, buying and selling stock and the like. Those applications necessitate only a small number of bitmap screens and they include no personal data. The client needs only to choose the right bitmap to show in response to the user's input (or to exit the enhanced TV mode). One of the most common services is a Service Navigator. A service navigator is a small scale Electronic Program Guide (EPG) that can be shown on screen while still watching the TV program that the tuner is tuned to. EPG applications include displaying EPG information on the TV screen. The EPG information relate to programs that are either displayed on the screen, transmitted programs or programs that are scheduled to be transmitted. As an example, the user may push a button on a remote control unit to view the details of the program that he is watching, the running event (name, start time, end time, a scroll bar reflecting the part of the event that already elapsed, icons on special features like multilingual soundtracks, closed captions, teletext etc.), details on the next event to be shown in that program, details on other programs and the events that are currently shown on those programs etc. Such a navigator application is most needed because of the disadvantages of a full-blown EPG: the latter requires a long tuning-into and tuning-out-of time, as well as a few clicks on the remote until the relevant selection is made. EPG information can be generated at the head-end and provided as bit maps within media packets to the DHCT, but this is not necessary, as EPG information can also be extracted from media streams that convey SI tables. Accordingly a client can be configured to extract EPG information from media packets and to display the EPG information on top of the overlay layer.

The invention provides a system and method in which dynamic visual objects are generated by displaying a sequence of bitmaps.

The invention provides a system and method in which media data packets transmitted also include encoded text or encoded icons to be interpreted by the client and translated into preloaded bitmaps.

The invention provides a system and method in which the digital services includes personalized applications. For example, a user could request to see his payment balance to the service provider, or the list of Pay-Per-View movies that he watched in the last month. That information will be transmitted from the headend on the same channel that he is tuned to, and will be displayed to him by the client. Such personal applications may necessitate means of data security, in order to encrypt the personal data so that only the destined user could access it.

The invention provides a system and method that supports IP in-band data sessions.

The invention provides a system for providing enhanced services, the system includes: (A) A multiplexed sequence generator for generating a multiplexed digital sequence; the multiplexed digital sequence including a plurality of digital representations of analog programs. (B) A transmitter, for transmitting the multiplexed digital sequence to a plurality of digital home communication terminals. Wherein each digital home communication terminal has a display unit and wherein the digital home communication terminal is configured to allocate a first portion of the display unit to display a digital representation of an analog program out of the plurality of analog programs and allocate a second portion of the display unit to be utilized for digital services, in response to a selection of the analog program and the digital service.

The invention provides a digital home communication terminal that has a receiver, for receiving a digital representation of at least two analog programs; a display unit; and a controller, for allocating a distinct portion of the display unit for each digital representation of an analog program; and for controlling a display of a single digital representation of an analog program in response to a selection of the analog program; wherein the single digital representation is displayed such that the display unit can also be utilized for digital services.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The disclosed technique is directed to a broadband network, which can be either wired or wireless, such as an HFC network, satellite communication and the like. The examples set forth interfaces an HFC network and hence includes specific cable related modules. For example, a network transmitter in the context of an HFC would be a QAM unit. These specific modules have to be replaced with equivalent modules, when operating on other types of broadband networks.

The following are definitions, which are used throughout the description of the disclosed technique:

DVB/ASI and DHEI are examples for digital video (MPEG) transmission specifications. The disclosed technique provides examples, which include DVB/ASI modules. It is noted that these DVB/ASI modules, can be replaced by equivalent modules, such as DHEI modules, and the like.

DOCSIS is a data over cable transmission specification. CMTS denotes cable modem termination system, which is conventionally used for DOCSIS. MPEG denotes a family of media (especially video and audio) decoding and multiplexing specifications where ISO/IEC 11172 is also called MPEG-1 and the ISO/IEC 13818 is also called MPEG-2.

For convenience of explanation it is assumed that both digital services and analog services, such as digital television and analog television channels can be switched across the same local paths of each Broadband Multimedia System (BMS). It is noted that for the purpose of the invention analog and digital services can be conveyed over distinct paths. For example, while digital service signals are down converted and passed across a packet switching router, such as router 116, analog service signals can remain in a high frequency form, such as RF form, to be later combined with up-converted digital service signals that are outputted by the router.

The scope of the invention is not limited to single tuner DHCTs, and can be applied to DHCTs that have more than a single tuner. For convenience of explanation only, FIG. 1 and the following figures refer to a single tuner DHCT.

Figure 1:
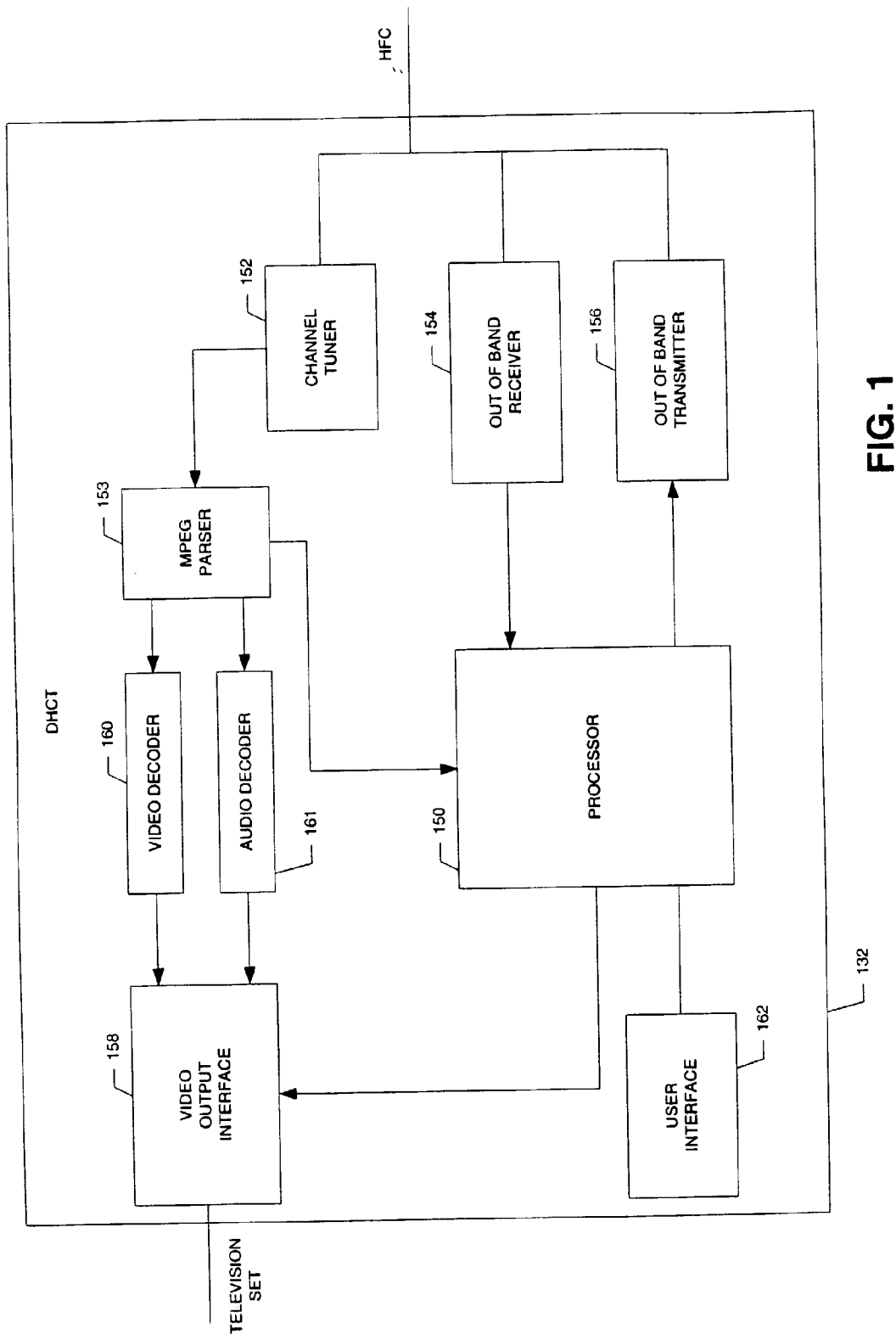
FIG. 1 is an illustration of a DHCT, operative in accordance with a further preferred embodiment of the present invention.

Reference is further made to FIG. 1, which is a schematic illustration of a single tuner DHCT 132. DHCT 132 includes a channel tuner 152, an MPEG parser 153, an Out-Of-Band receiver 154, an Out-Of-Band transmitter 156, a user interface 162, a processor 150, a video decoder 160, audio decoder 161, a storage unit (not shown) and a video output interface 158. MPEG parser 153, Out-Of-Band receiver 154, Out-Of-Band transmitter 156, user interface 162, video output interface 158 and the storage unit, are connected to processor 150. Video decoder 160 and audio decoder 161 are connected to MPEG parser 153 and to video output interface 158. Channel tuner 152, Out-Of-Band receiver 154 and Out-Of-Band transmitter 156 are further connected to the HFC. Channel tuner 152 is further connected to MPEG parser 153. Video output interface 158 is further connected to multimedia output unit such as a television set and may further be connected to an audio system (not shown).

DHCT 132 receives elementary video, audio and data streams on MPEG transport in In-Band channels, via channel tuner 152. Channel tuner 152 tunes into the selected In-Band channel and provides the signal thereof to MPEG parser 153. MPEG parser 153 distributes the elementary streams received in the channel between processor 150, video decoder 160 and audio decoder 161. It is noted that MPEG parser 153 distributes only elementary streams, which belong to a specific program. MPEG parser 153 provides digital service packets to processor. Usually, digital services packets, conveying digital services, have a unique PID identifier.

Video decoder 160 decodes the video elementary stream provided thereto and produces video output, to be provided to a television set via video output interface 158. Audio decoder 161 decodes the audio elementary stream provided thereto and produces audio output, to be provided either to a television set or to an audio system, via video output interface 158.

DHCT 132 and especially processor 150 are controlled by an operating system and at least one lower level software code. One of the lower level software codes, referenced enhanced code (EC), allows for processing control and/or display code portions embedded within digital service packets, generating an overlay layer or selecting an overlay layer out of a set of overlay layers transmitted from a headend, and accordingly display an overlay layer that covers all but a selected digital representation of an analog program and above the overlay layer displays text and/or visual objects embedded within digital service packets. The EC can also manipulate the visual objects and react to events that are related to the visual objects. EC is usually downloaded to DHCT 132 through a downstream channel and then installed on it.

According to an aspect of the invention, control and/or display code is embedded in MPEG transport packets, referred to as digital service packets. All digital service packets include a unique PID that identifies them as being digital service packets. Each digital service packet has a unique IID that differentiates it from other digital service packets. An IID can also be used to identify all digital service packets that are related to a single visual object. Digital service packets are received at channel tuner 152 and forwarded to MPEG parser 153. MPEG parser identifies the unique PID and sends the received digital service packet to processor 150, either directly of via a storage unit. EC recognizes that digital service packet were provided to processor 150, filters the digital service packets in view of their IID, such that only display and control codes relating to a selected visual object are executed by processor 150. In response, processor 150 produces visual and audible signals. Processor 150 provides these video and audio signal to video output interface 158, which in turn provides them to the television set connected thereto. It is noted that the visual signal produced from the received data can be combined on screen with the video decoded from the video elementary stream.

Processor 150 is also operable to generate overlay layers or to extract overlay signals from received digital service packets or overlay packets provided by the HFC network and to send signals to a display unit such that the display unit displays on one portion a digital representation of a selected analog channel while displaying an overlay layer on the other portion of the screen. It is noted that visual and textual objects that are related to a digital service are displayed over the overlay layer.

Processor 150 is also operative to determine the location of visual and textual objects embedded within digital service packets. The determination is responsive to location data embedded within the digital service packets and to the location of the overlay layer.

It is noted that in response to a request to receive an enhanced TV service while viewing an analog program the enhanced TV service is provided and a digital representation of the analog program is selected by the DHCT to be displayed to the end user. The selection of a selected digital representation of the analog program is followed by a selection of an overlay layer that masks other digital representations of analog programs and visual and/or textual object embedded within digital service packets are displayed. It is noted that processor 150 further determines the location of the visual/textual objects such that they are displayed over the overlay layer.

The EC is relatively "thin", as it only needs to filter/select relevant digital service packets, to select an overlay layer or to generate it, to determine the location of audio/visual objects embedded within digital service packets and to provide video output interface 158 with display instructions that are embedded within the selected digital service packets, and to interpret incoming signals from user interface 162 to events. DHCT 132 is not aware of logical connections between digital service packets of distinct visual objects, and usually merely changes its filter in view of detected events, to select digital service packets.

According to an aspect of the invention the display code is in a form of a bitmap, that enables processor 150 to process it, to change the coordinates of the visual images, in response to the selected overlay layer, and provide it as an overlay object on top of the video object, via video output interface 158.

According to another aspect of the invention the display code within a digital service packet is responsive for displaying a predefined segment of the visual object. Each digital service packet is self-contained. Said in a different manner, a content of a digital service packet does not depend upon the content of another digital service packet. If a digital service packet is "lost" then only a fragment of the visual object is missing. Partitioning a single visual object to a large number of digital service packets assures that the loss of a single digital service packet does not result in severe visual quality degradation.

Figure 3:
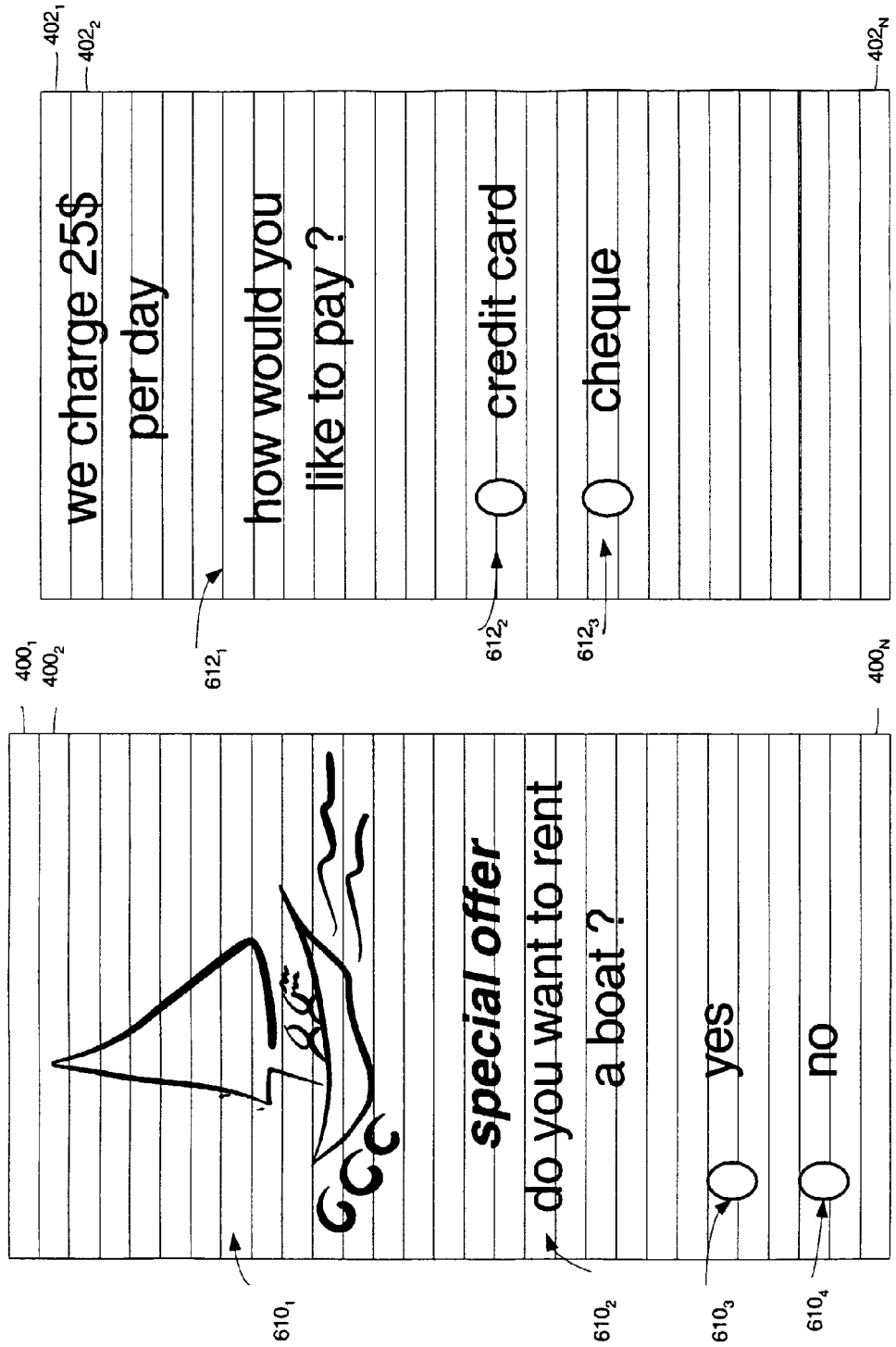
FIG. 3 is a schematic illustration of a plurality of digital service packets containing display and control code that enable the display of a visual object of a sail boat, according to a preferred embodiment of the invention.

Referring to FIG. 3, illustrating a plurality of digital service packets $400_1$-$400_N$ containing display and control code that enable the display of a visual object of a sail boat $610_1$, and visual objects such as text "special offer do you want to rent a boat", "yes" "no" generally referenced $610_2$, and two "hot keys" $610_3$ and $610_4$. The control code portion of the control and display code embedded within digital service packet $400_1$-$400_N$ allows a television viewer to select one of the two "hot keys" in response to a signal generated by a remote control unit and received at user interface 162. The segmented visual object and text illustrate that each digital service packet out of digital service packets $400_1$-$400_N$ includes display code that is responsible for the appearance of a segment of the visual object. It is further noted that not each digital service packet has both display code and control code, as some can include only a single type of code.

Figure 4:
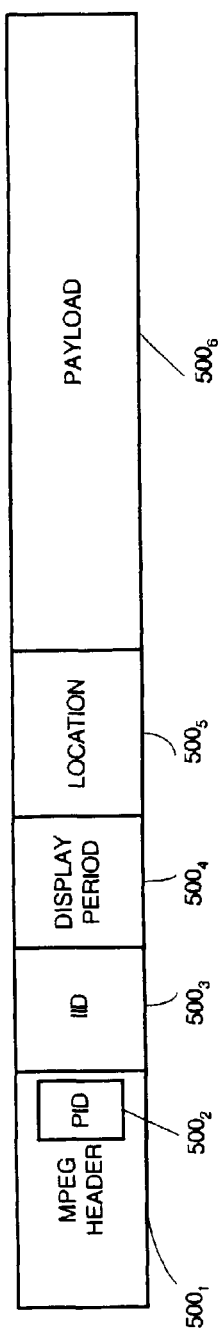
FIG. 4 is a schematic illustration of a digital service packet, according to a preferred embodiment of the invention.

Referring to FIG. 4, illustrating digital service packet 500, according to a preferred embodiment of the invention. Digital service packet 500 has an MPEG transport header $500_1$, the header includes a PID field $500_2$. The value of the PID filed indicates that the MPEG transport packet is an digital service packet. Digital service packet 500 further includes a unique IID field $500_3$, and additional display and control fields, such as display period field $500_4$, location field $500_5$ and payload $500_6$. Location field can be used to indicate a location on the television screen of the visual content included within payload $500_6$. It is noted that the location may be responsive to the location of the overlay layer. Accordingly, the information embedded within location field $500_5$ is further processed before the media content of the packet is displayed.

Digital service packet 500 can include additional fields such as a PTS field indicative of a time in which the visual content of 500 should be presented/displayed. Payload $506_6$ can include control code that determines which digital service packets are filtered and provided to processor 150 and which are discarded. Digital service packet 500 can include additional information and control fields such as a type of display field indicating if the visual object is overlay, transparent or semi-transparent and the like.

It is noted that if a DHCT that has two tuners, the display can be also provided as a picture in picture. In such a case a first tuner is tuned to receive and display the video signals while the second tuner is tuned to receive video signals including the interactive related display.

User interface 162 receives commands from a user and provides them to processor 150. Processor 150 analyzes the user commands and may transmit data in the upstream direction using Out-Of-Band transmitter 156.

DHCT 132 can receive narrow cast data that is submitted In-Band, as illustrated in U.S. patent application Ser. No. 09/595,624 filed on Jun. 16 2000 by Oz et al, which is incorporated in its entirety by reference.

Figure 2A:
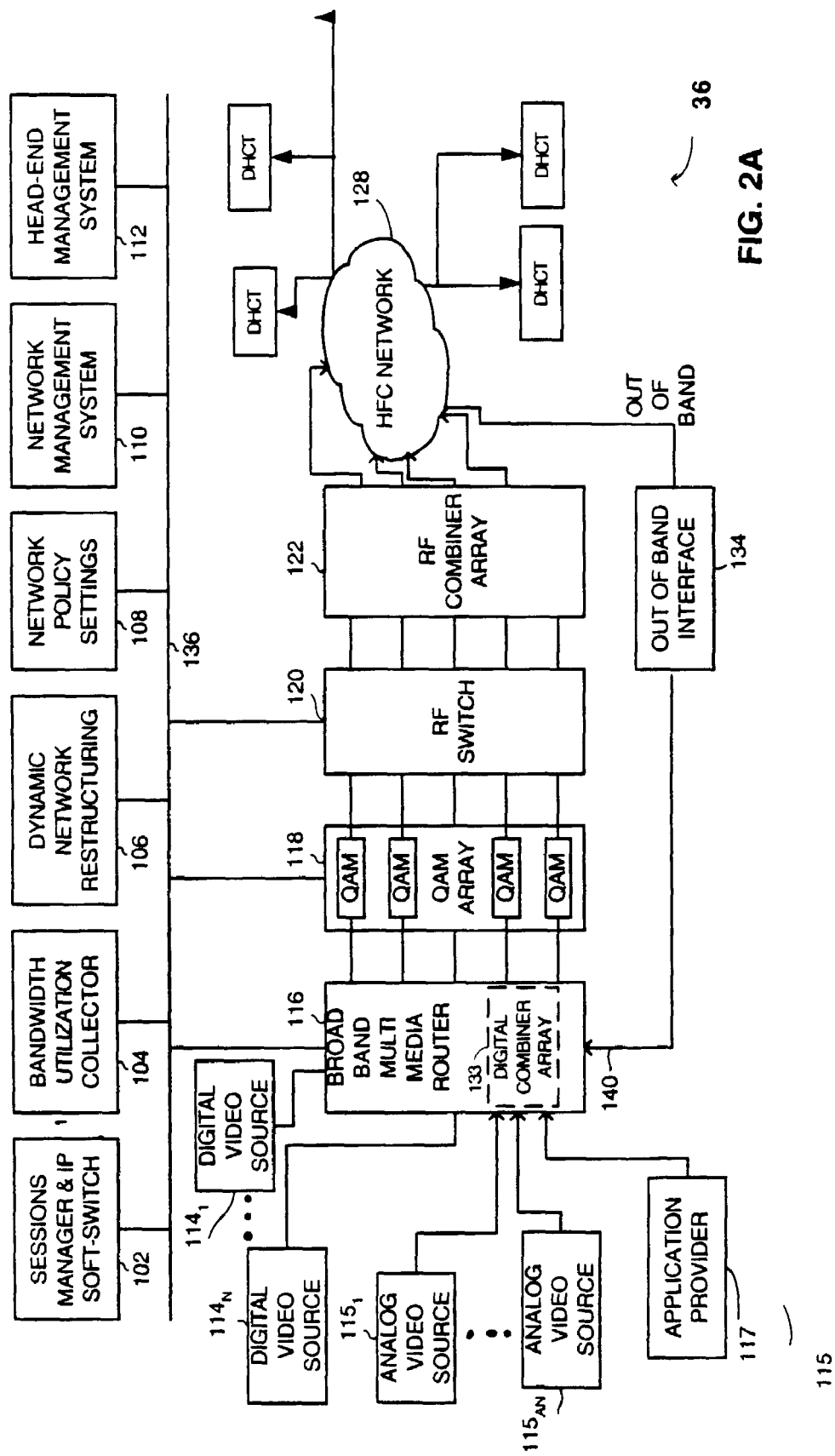
FIGS. 2A and 2B are schematic illustrations of a Broadband Multimedia System, constructed and operative in accordance with preferred embodiments of the present invention.
Figure 2B:
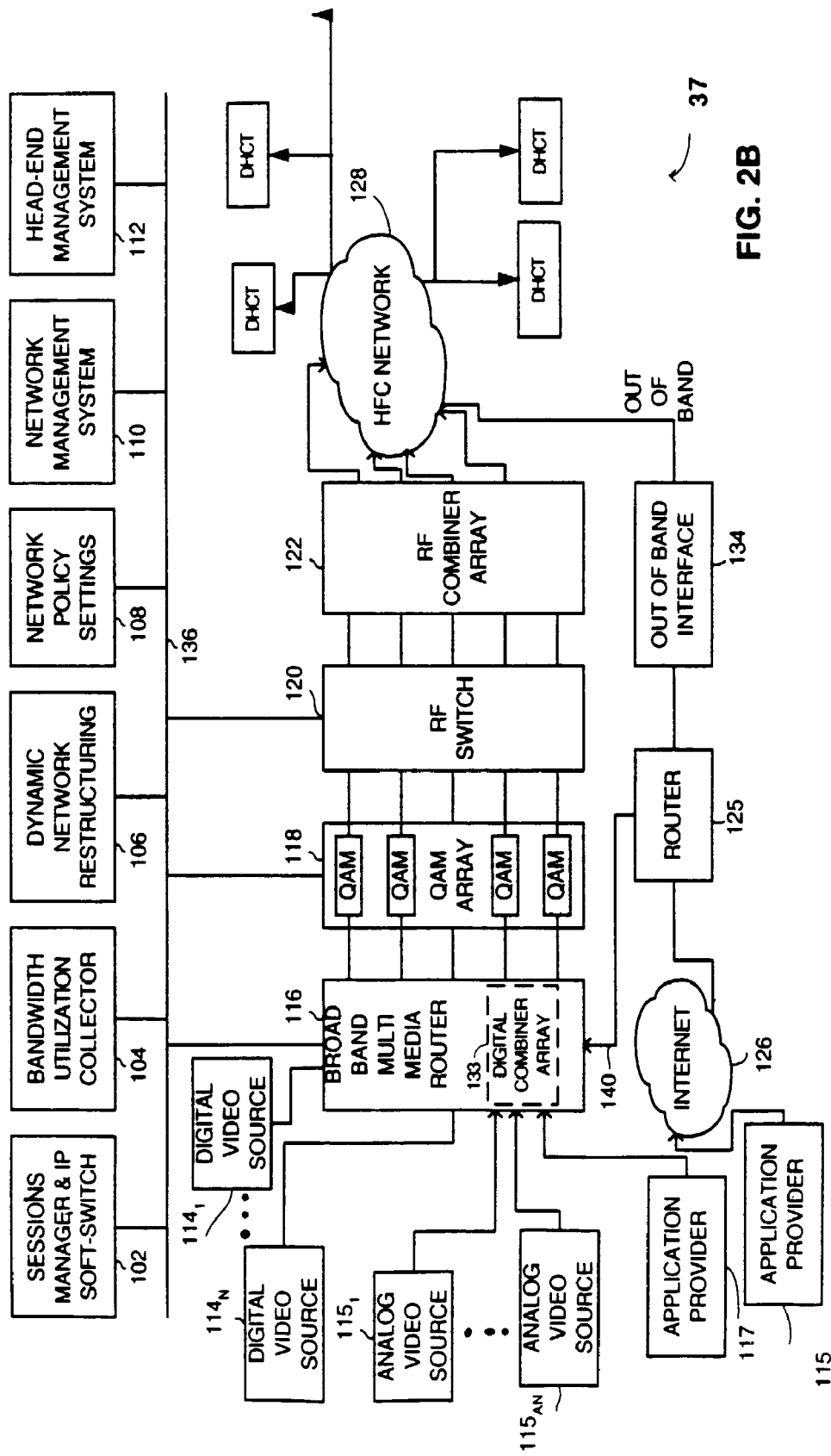

Reference is now made to FIGS. 2A and 2B, which are schematic illustrations of BMS 37 and 36, accordingly, constructed and operative in accordance with preferred embodiments of the present invention.

BMS 37 of FIG. 2B is analogues to BMS 36 of FIG. 2A but has an additional router 125, it is further coupled to internet 126 and to an additional digital service provider server 115. Router 125 is coupled via link 140 to broadband multimedia router 116 for allowing DHCTs to interact with internet 126 and additional digital service provider server 115. Digital service providers such as digital service provider servers 115 and application provider 117 are configured to provide control and display code, embedded within a plurality of digital service packet. Router 125 can also be utilized to download ITC from internet 126.

BMS 36 includes a digital combiner array 133, a overlay layers generator (not shown), a logical communication bus 136, a session manager unit 102, a bandwidth utilization collector 104, a dynamic network restructuring unit 106, a network policy settings unit 108, a network management system 110, a broadband multimedia router 116, a QAM array 118, an RF switch 120, an RF upstream module (not shown), an RF combiner array 122, an Out-Of-Band unit 134, and a management system 112. BMS 36 is coupled to a plurality of DHCTs via Hybrid Fiber Coax (HFC) network 128.

Broadband multimedia router 116 is coupled to logical communication bus 136, RF upstream module 124, QAM array 118, to at least one application provider, such as digital service provider server 115, to analog and digital media providers such as VOD servers 252, music on demand unit 254, interactive MPEG unit 256, Internet television 258, telephony gateway 262, and the like.

Session manager unit 102, bandwidth utilization collector 104, dynamic network restructuring unit 106, network policy settings unit 108, network management system 110, and management system 112 are further connected to the logical communication bus 136.

RF switch 120 is connected to logical communication bus 136, QAM array 118 and to RF combiner array 122. RF upstream module 124 is connected to broadband multimedia router 116, and to the plurality of DHCTs via the HFC network. RF combiner array 122 is further connected to Out-Of-Band unit 134 and to a plurality of DHCTs.

Session manager unit 102 receives and approves session requests, processes them and provides routing parameters to the broadband multimedia router 116. During at least some of the sessions, multiple digital service packets are broadcast to a plurality of DHCTs. During at least some other sessions, digital representations of analog programs are broadcast to a plurality of DHCTs. During yet other sessions overlay signals embedded within either overlay packets or digitals ervice packets are broadcast to a plurality of DHCTs.

According to an aspect of the invention each service group receives a plurality of digital service packets that are related to the content of the programs either provided or being watched by the members of the service group. The provision of digital service packets that are related to the programs being viewed by the members of the service group requires each DHCT to send an upstream signal, via out of band interface 134, indicating the currently viewed program. BMS 36 receives the signals and in response updates a service group database indicative of the programs that are viewed by the members of the service group.

Broadband multimedia router 116 receives media streams from digital video sources $114_1$-$114_N$ of FIGS. 2A and 2B and from analog video sources $115_1$-$115_{NA}$. The media streams can include video streams, audio streams, data streams, individual data packets and the like. Such streams can be received over video channels, such as ones operative according to MPEG transport interfaces, or over data channels, such as TCP/IP over Ethernet communication lines. Some of said media sources can be Video On Demand (VOD) server 252, music on demand server 254, interactive MPEG 256, internet television 258, internet access 260 and local telephony gateway 262 of FIG. 7.

Figure 5:
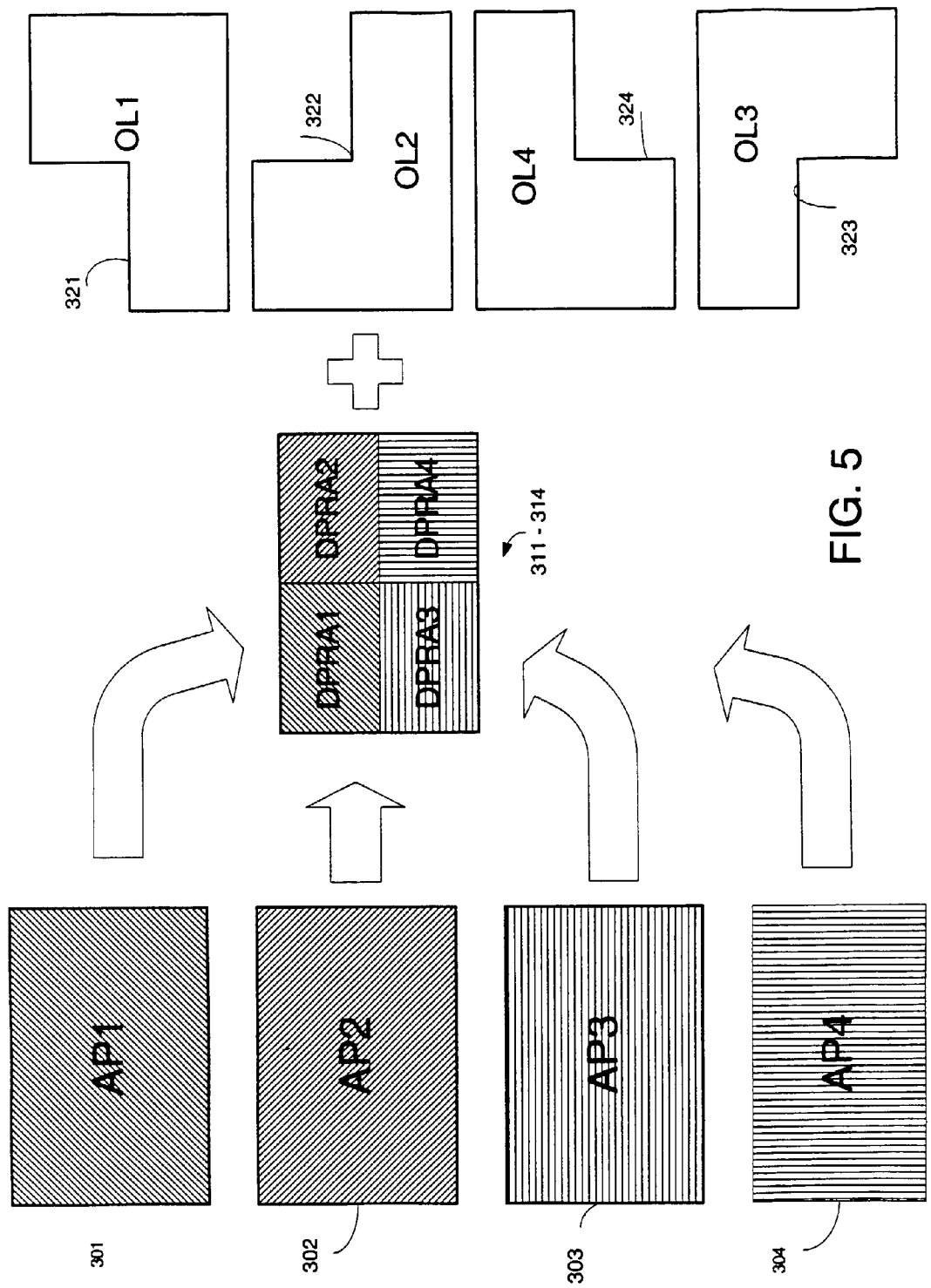
FIG. 5 illustrates four analog programs AP1-AP4, a digital representation of said program and overly layers, according to a preferred embodiment of the invention.

Analog video sources $115_1$-$115_{NA}$ are coupled to a digital combiner array 133. Digital combiner array 133 includes a plurality of digital combiners and encoders, each pair of combiner and are operable to receive a plurality of analog programs and to generate a multiplexed digital sequence. The multiplexed digital sequence is a digital representation of all the combined analog programs, that are conveniently arranged such as to be displayed as a mosaic of programs on a display screen. Pairs of combiners and encoders are known in the art. Referring to FIG. 5, four analog programs AP1-AP4 301-304 are converted to a multiplexed digital sequence that represents a mosaic of four programs DPRA1-DPRA 4 311-314. FIG. 5 also illustrates four overlay layers OL1-OL4 321-324 to be displayed on a display screen in response to a selection of a program out of 301-304.

It is noted that the digital service providers can provide various applications such as but not limited to general-purpose applications that involve exchange of data between an end user and a service provider, and/or personalized applications. General purpose applications include purchasing goods, ordering pizza, receiving weather report, buying and selling stock and the like. Those applications necessitate only a small number of bitmap screens and they include no personal data. The client needs only to choose the right bitmap (embedded within a plurality of uniquely identified digital service packets) to show in response to the user's input (or to exit the enhanced TV mode). One of the most common services is a Service Navigator. A service navigator is a small scale Electronic Program Guide (EPG) that can be shown on screen while still watching the TV program that the tuner is tuned to. EPG applications include displaying EPG information on the TV screen. The EPG information relates to programs that are either displayed on the screen, transmitted programs or programs that are scheduled to be transmitted. As an example, the user may push a button on a remote control unit to view the details of the program that he is watching, the running event (name, start time, end time, a scroll bar reflecting the part of the event that already elapsed, icons on special features like multilingual soundtracks, closed captions, teletext etc.), details on the next event to be shown in that program, details on other programs and the events that are currently shown on those programs etc. Such a navigator application is most needed because of the disadvantages of a full-blown EPG: the latter requires a long tuning-into and tuning-out-of time, as well as a few clicks on the remote until the relevant selection is made. EPG information can be generated at the head-end and provided as bit maps within media packets to the DHCT, but this is not necessary, as EPG information can also be extracted from media streams that convey SI tables. Accordingly a client can be configured to extract EPG information from media packets and to display the EPG information on top of the overlay layer.

The invention provides a system and method in which the digital service includes personalized applications. For example, a user could request to see his payment balance to the service provider, or the list of Pay-Per-View movies that he watched in the last month. That information will be transmitted from the headend on the same channel that he is tuned to, and will be displayed to him by the client. Such personal applications may necessitate means of data security, in order to encrypt the personal data so that only the destined user could access it.

Broadband multimedia router 116 also receives digital service packets from digital service provider server 117. According to an aspect of the invention, some applications are associated with a certain media stream, such as a program. For example, a set of various visual objects must be displayed to the viewers of a specific program. BMS 36 is able to transmit digital service packets to the viewers of the specific channel by tracking the resources that are allocated for the transmission of the specific program and allocating compatible resources for the transmission of the display and control data. For example, assuming that a DHCT has a single 6-Mhz wide tuner. If the specific channel is transmitted within a known window of 6-Mhz, then the display and control code have to be carried by a carrier signal within the known window.

According to an aspect of the invention, a digital service packet group is sequentially broadcast to each service group. Each group includes digital service packets that embedds control and display code related to a program out of the plurality of programs either provided or viewed by the members of the service group. The sequential transmission provides robustness, as each digital service packet is retransmitted to the members of a service group. Conveniently, each digital service packet groups includes control and display code for allowing the display of a sequence of associated visual objects. The sequence may include visual objects that are displayed in response to events related to other visual objects of the sequence. For example, an exemplary sequence includes digital service packets $400_1$-$400_N$ and $402_1$-$402_N$, whereas the display of the visual object within digital service packets can cause a viewer to select "hot key" $610_3$, and in response to display the object embedded within $402_1$-$402_N$. Each visual object has a unique object ID (IID). The IID is embedded within each digital service packet that is related to an object. The IID allows for filtering digital service packets of a relevant visual object, while discarding other digital service packet.

In order to receive an digital service packet, DHCT 132 has to be tuned to a frequency window that includes the carrier frequency of the digital service packet. DHCTs having more than a single tuner can be configured to receive the digital service packet and additional data on a predefined frequency. The predefined channel does not necessarily relate to the frequency of a received program. In such a case digital service packets can be carried over carrier waves having that predefined frequency. DHCTs that have a single tuner have to receive the relevant applications packet with their single tuner. According to an aspect of the invention, BMS 36 tracks the programs that are being viewed by the members of a service group and adjusts the carrier frequency of digital service packets that are intended to be received by the members of the service group.

The adjustment can require changing the resources allocation of BMS 36. According to an aspect of the invention digital service packets are transmitted both at various frequencies, some corresponding to the programs that are currently viewed by the members of a service group, whereas some frequencies correspond to other programs, referred to as auxiliary frequencies. If a viewer asked to be tuned to a program that is transmitted over one of the auxiliary frequencies, there is no need to change the resource allocation of BMS 36.

A reallocation of BMS's 36 resources can be handled by session manager 102, dynamic network reconstructing 106 and other units within BMS 36. Tracking the viewed programs allows for decreasing the resources (carrier frequencies) required to allow the provision and reception of digital service packets by DHCTs. If BMS 36 does not track the viewing patterns, more carrier frequencies will be required to carry the digital service packets such that relevant digital service packets can be received by the DHCTs. Tracking the frequency window of a DHCT requires only minimal transmission of information over the upstream channel. When a viewer changes a program a short message is sent upstream.

The routing parameters produced by session manager 102, specify input and output routing commands for broadband multimedia router 116, to operate there according. It is noted that a conventional MPEG transport stream does not include routing information such as destination or origin, rather just limited identification information, known as PID (Packet Identification) The disclosed technique overcomes this. Broadband multimedia router 116 forwards packets from a selected input port to a specified output port, according to either routing information embedded in the routed packet, or according to the routing parameters, associated with that routed packet.

According to the disclosed technique, each session entering the system has to be approved, and hence can also be denied. The session manager 102 receives session initialization requests from a variety of media sources, such as digital service provider servers, end-users, and additional modules. The session manager 102, determines if these requests are compatible with each of a plurality of policy types and available resources, and determines whether or not to approve or deny these requests. According to a preferred embodiment of the invention, one type of session request indicates that a member of a service group requests to view a television channel.

The session manager unit 102 uses bandwidth parameters stored in bandwidth utilization collector 104, regarding the current bandwidth utilization. The session manager 102 accesses network policy settings unit 108, to determine if a selected initialization request conforms to various network policies. A network policy can virtually include any condition, which applies to the content, type, source, destination, network, and the like, which are included in the session initialization request. For example, a policy can discard the transmission of an analog program if the digital representation of the analog program is already being transmitted and it the end-users are equipped with DHCT. Policy rules can also include selected types of sessions are denied for a selected node, when the bandwidth usage at that node, exceeds a predetermined value. In another example, a network policy can include a condition, which does not allow X-rated movies to be transmitted to selected end-users, at predetermined hours of the day. A further example for a network policy can include a condition where a selected source can only provide services to selected users, and not to others, and the like. The session manager further accesses network management system 110, for determining if there are malfunctions in selected parts of the network. According to a preferred embodiment of the invention, a network policy defines a group of digital and analog television channels that can potentially be provided to the members of the s'th set of service groups coupled to BMS 36. The content of the group can be dynamically configured, in view of the behavior patterns, and/or requests of the members.

QAM array 118 includes a plurality of QAM units (not shown), each receiving DVB/ASI media information and transmitting it modulated over an RF channel, connected thereto.

RF combiner array 122 includes a plurality of RF combiners (not shown), each operative to receive a plurality of RF channels and produce a single, multi-band RF signal, therefrom. The amount of QAM units usually is much larger than the amount of RF combiners. The RF switch 120 is operative to route RF channels from each port therein, to each other port therein. Hence, RF switch 120 can connect each QAM of QAM array 118 to each RF combiner of RF combiner array 122, and thus, dynamically control network RF resources. Dynamic network restructuring unit 106 controls each of the QAMs, thereby determining which frequencies that QAM shall modulate to. Dynamic Network Restructuring unit 106 further controls RF switch 120, such that the signals received from each of the QAMs are directed to a selected one of the RF combiners. Hence, Dynamic Network Restructuring unit 106 provides dynamic restructuring of the RF portion of the network. Each of the RF combiners receives channels in frequencies that have been transmitted from the QAM through RF switch, and combines them on a single line connected to members of a service group via HFC network communication link. This direction is called downstream. Members can include DOCSIS compatible cable unit, non-DOCSIS compatible cable units, cable units that have different paths for video signals and for data signals, cable units that have a single path, and the like.

According to the present invention, end-user equipment (such as DHCT) is also capable of transmitting data to the Head-end. This direction is called upstream. RF upstream module 124 receives signals from the end-user equipment, and performs down-conversion and demodulation thereof. RF upstream module 124 can further include an RF switching mechanism, which optimizes the usage of the upstream direction, and hence can further enhance the operation of BMS 36. The Out-Of-Band (OOB) module 134 communicates with each of the targets of that upstream information in the Head-end, thus providing a reverse channel from HFC network 128 to Head-end. The transmitted data can include television channel requests. According to another aspect of the invention OOB module 134 is also used for transmitting downstream information.

Figure 6:
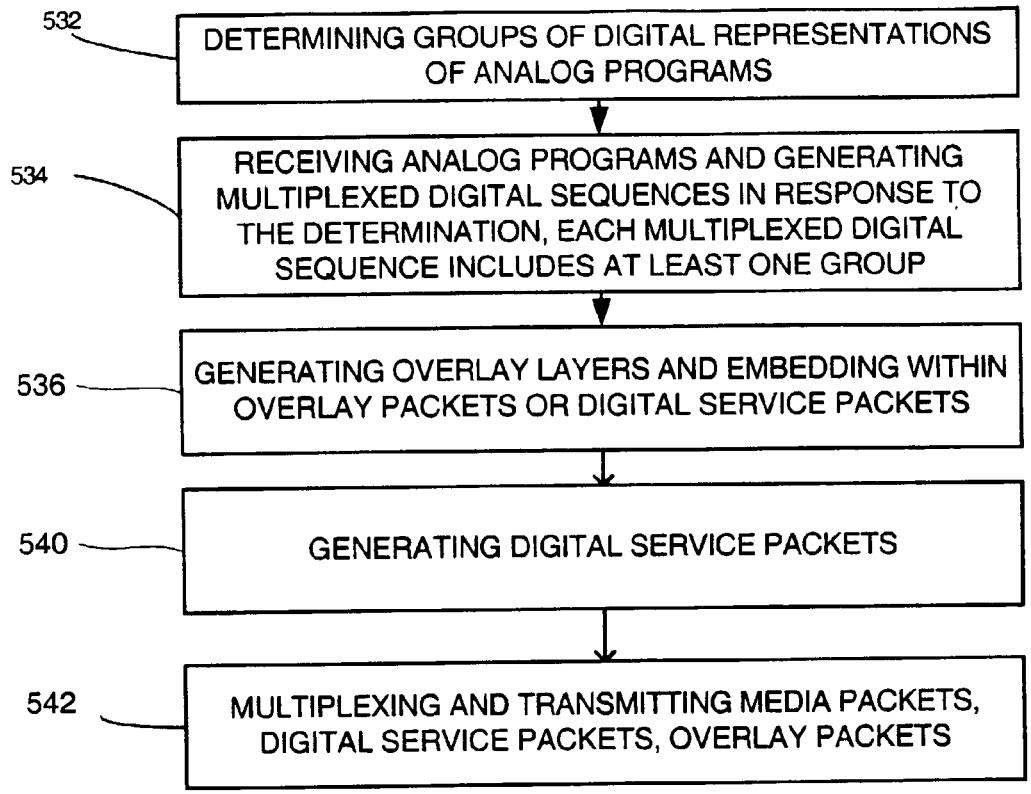
FIG. 6 is a flow chart illustrating a method for providing digital services to end users, in accordance with a preferred embodiment of the invention.

Reference is now made to FIG. 6, illustrating method 530 for providing digital services to end users, in accordance with a preferred embodiment of the invention.

Method 530 starts by step 532 of determining groups of digital representations of analog programs. The determination can be predefined, can be responsive to the content of the analog programs, may be responsive with policy rules, can be driven from the viewing patterns of viewers, can be responsive to requests from DHCTs users, and can also be responsive to the analog programs being currently received, and the like.

Step 532 is followed by step 534 of receiving analog programs and generating multiplexed digital sequences in response to the determination of step 532. Each multiplexed digital sequence includes a group of digital representations of at least one analog program. Step 532 includes receiving analog programs, routing the analog programs to combiners, such as digital combiner array 133, and generating the multiplexed digital sequences. Digital representations of a analog programs of the same group are arranged such as to be displayed as a mosaic of programs on a display screen.

Step 534 is either followed by or executed in parallel to step 536 of generating overlay layers and embedding the overlay layers within either overlay packets or digital service overlay packets. The overlay layers are associated with different location of a display unit such that when a viewer decides to view an analog program, a digital representation of that program is displayed on a known portion of the display screen, while the other digital representations of the same digital multiplexed sequence are blanked by the overlay layer.

Steps 534 and 536 are either followed by or executed in parallel to step 540 of generating digital service packets. Steps 540, 536 and 534 are followed by step 542 of transmitting the digital service packets, the digital multiplexed sequences to the end users. It is noted that step 542 can further include transmitting digital programs. It is further noted that overlay layer data may be transmitted repeatedly, or only when it is necessary. For example, during an initialization step of the system, and during any updated in the location of digital representations of analog programs.

According to an aspect of the invention the overlay layers are generated by the DHCTs and there is no need to transmit overlay packets or digital service packets conveying overlay layer information.

Usually, the transmitted packets, such as media packets, digital service packets, overlay packets are multiplexed and transmitted. It is noted that the transmission can be more effective when the transmission is preceded by a step of tracking the reception characteristics of end users, such as end-users tuners frequency range.

Figure 7:
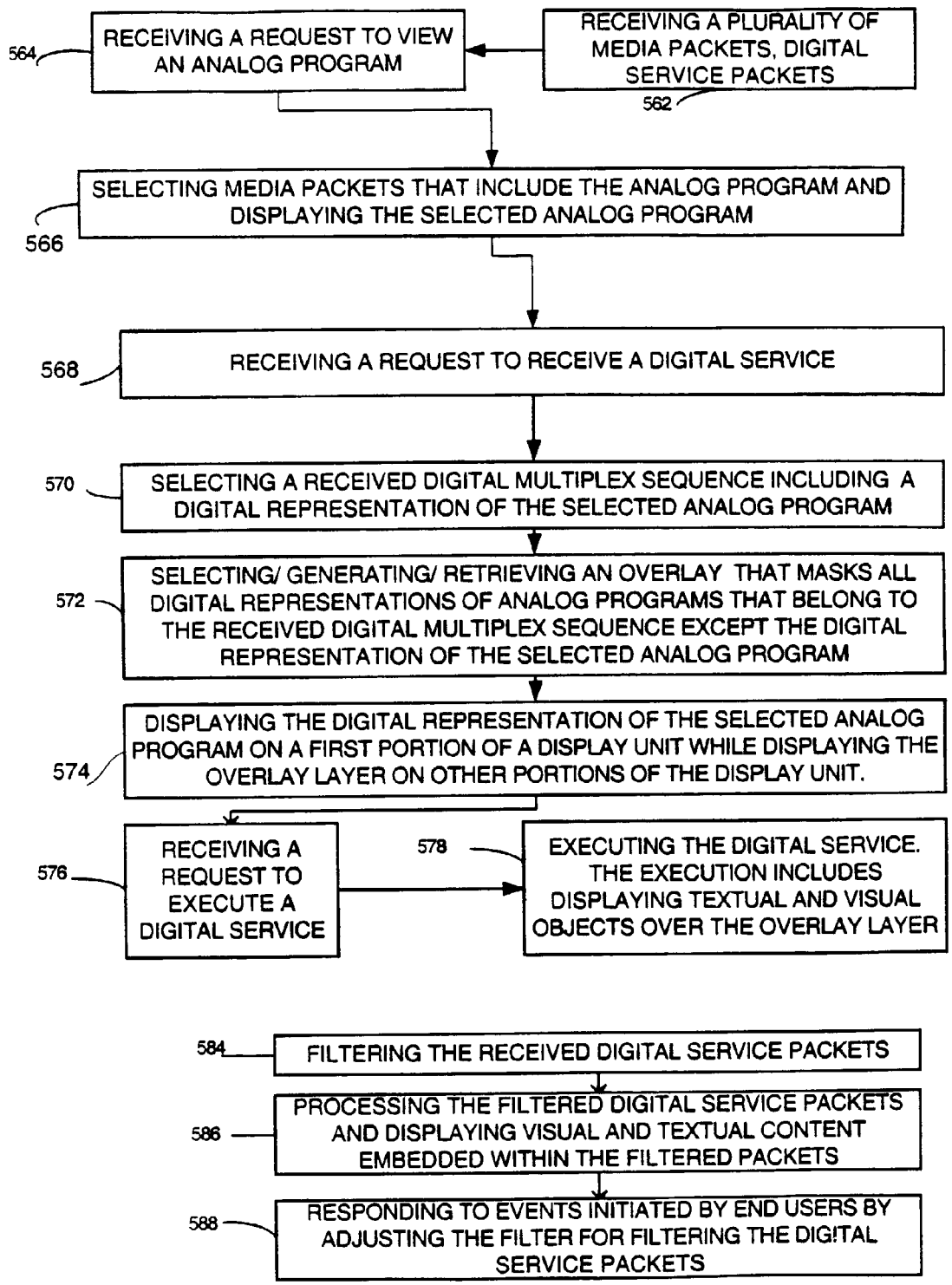
FIG. 7 is a flow chart illustrating a method for displaying a digital representation of an analog program on a display unit of an end user, in accordance with a preferred embodiment of the invention.

Reference is now made to FIG. 7 illustrating step 540 of generating digital service packets. The digital end users are provided to end-users, each end-user has a display unit and a control unit, the control unit configured to control the display unit.

Step 540 includes step 542 of selecting digital service code portions to be embedded in selected digital service packets and generating the selected digital service packets. Referring to the example set forth in previous figures, such as FIG. 4, the content of a digital service packet group can be responsive to various parameters, such as media packets provided to the same end-users, end-user profiles, end-user viewing patterns, and the like. It is noted that digital service packets belonging to more than a single group can be selected. For example, during step 552 a plurality of digital service packets, destined to the same group of end users may be selected. These digital service packets are referred to as group-associated digital service packets. Conveniently, the generation includes a step of embedding selected application code portions in digital service packets and generating digital service packet headers, such as the header disclosed in FIG. 5.

According to another aspect of the invention the digital service packets are generated and stored at a storage means, such as a storage unit of digital service packets. In such a case the selection of selected digital service packets can include a selective retrieval of the selected digital service packets from the storage unit.

Step 542 is followed by step 544 of multiplexing the selected application code portions to form at least one digital service packet group. The DHCT of each end-user is configured to process the digital service packets of a digital service packet group out of the at least one digital service packet groups, and accordingly (i) display at least a portion of a visual object on the display unit, or (ii) react to events that are related to the display of the at least portion of the visual object on the display unit.

Reference in now made to FIG. 8, illustrating method 560 for displaying a digital representation of an analog program on a display unit of an end user.

Method 560 starts by step 562 of receiving a plurality of media packets. The media packets allow for displaying analog programs, digital programs and digital representation of analog programs to an end-user that are equipped with a DHCTs. It is noted that the media packets may also include analog programs, for example when some end-users have only analog interfaces, or in cases where various regulations require the transmission of analog programs. As further illustrated, if an end user selects to view an analog program without initiating an enhanced TV service, the analog program is displayed, while if the end user selects to view the analog program and to receive an enhanced TV service, the digital representation of that analog program is displayed to the end-user. When the latter selection is made the DHCT selects to display the digital representation of the analog program, an associated overlay layer and information related to the selected enhanced TV service.

Step 562 is followed by step 564 of receiving a request from an end-user to view an analog program Step 564 is followed by step 566 of processing the received media packets and selecting the media packets that include the analog program and accordingly displaying the analog program.

Step 566 is followed by step 568 of receiving a request to receive an enhanced TV service.

Step 568 is followed by step 570 of selecting a received digital multiplexed sequence that includes the digital representation of the selected analog program.

Step 570 is followed by step 572 of selecting an overlay layer that masks all digital representations of analog programs of the selected digital multiplexed sequence except the digital representation of the selected analog program. It is noted that the selection is done by filtering either overlay packets or digital service packets embedding the overlay layer. According to another aspect of the invention step 538 includes generating the overlay layer instead of selecting it out of received packets. According to yet another aspect of the invention the overlay layer may be fetched from a storage unit within the DHCT, the storage unit stores overlay information previously received during an initialization step or an update step.

Step 572 is followed by step 574 of displaying the digital representation of the selected analog program and the overlay layer.

Step 574 is followed by step 576 of receiving a request from an end-user to execute a digital service.

Step 576 is followed by step 578 of displaying digital service text and visual object over the overlay layer.

Step 578 conveniently includes steps 584-588.

Step 584 filters digital service packets according to a criterion. The criterion can reflect an application priority, an application that is related to a program displayed or provided to an end-user, and the like. Referring to the example set forth in FIG. 1, the received media packets and digital service packets are, provided to MPEG parser 153 that filters the packets according to their PN/PID. Digital service packets have a unique PID that causes MPEG parser 153 to provide them to processor 150. ITC identifies the digital service packets and filters the digital service packets according to their IID. The filtering process allows to "pass" only digital service packets that are related to the same video object (or set of video objects that are displayed at the same time on the end-users television set) and digital service packets that allow to respond to events related to the displayed visual objects, and digital service packets allowing for manipulating the visual objects. For example, an application can start by displaying visual objects $610_1$-$610_4$ and accordingly only digital service packets $400_1$-$400_N$ "pass" the filtering process and are processed by processor 150. The filtering can change in response to events initiated by the end-user. For example, if an end-user selects "hot key" 6103, the filter is configured to "pass" digital service packets $402_1$-$402_N$.

Step 584 is followed by step 586 of processing the filtered digital service packets and accordingly displaying a visual object. Step 586 include determining a location of the visual objects such that they are displayed over the overlay layer. The determination may be followed by a step of converting the location information embedded within the visual objects. For example, the location embedded within the packets can relate to a displacement from a selected point, whereas the selected point may be responsive to the location of the overlay layer. Conveniently, the filtered digital service packets can allow for manipulating the visual objects.

Step 586 is followed by step 588 of responding to events generated by an end-user by adjusting the filter for filtering digital service packets. Conveniently, the response can also include transmitting upstream information. The transmission is usually made in response to only some of the events, or the display of some visual objects. Usually, the execution of an application requires that a sequence of visual objects is displayed and upstream information is transmitted only in response to some of the visual objects. For example, when an end-user is required to confirm a purchase, to enter his credit card details and the like. The latter details can also be stored in a database accessible by the digital service provider server such that the end-user is not required to enter said details more than once.

It is noted that the method and apparatus according to the present invention can be implemented either in hardware, in software or in a combination thereof.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

The invention claimed is:

1. A method for providing enhanced services, the method comprising the steps of:
   generating a digital representation of at least two analog programs;
   allocating a distinct portion of a display unit for each digital representation of an analog program; and
   displaying a single digital representation of an analog program in response to a selection of the analog program; wherein the single digital representation is displayed such that the display unit can also be utilized for digital services;
   wherein an overlay layer is generated by a digital home communication terminal;
   wherein an overlay layer is generated in response to a reception of instruction code embedded within media streams provided to the digital home communication terminal.

2. The method of claim 1 wherein the instruction code is transmitted in a channel selected from a list consisting of an in-band channel and an out-of band channel.

3. A system for providing enhanced services, the system comprising:
   (a) a multiplexed sequence generator for generating a multiplexed digital sequence; the multiplexed digital sequence comprising a plurality of digital representations of analog programs;
   (b) a transmitter, for transmitting the multiplexed digital sequence to a plurality of digital home communication terminals; wherein each digital home communication terminal has a display unit and wherein the digital home communication terminal is configured to allocate a first portion of the display unit to display a digital representation of an analog program out of the plurality of analog programs and allocate a second portion of the display unit to be utilized for digital service, in response to a selection of the digital service; and
   (c) a controller, for selecting application code portions to be embedded in digital service packets and to provide the transmitted digital service packet group, the digital service packet group comprising digital service packets embedding the selected code portions.

4. The system of claim 3 wherein the transmitter is further operable to transmit a digital service packet group to at least one digital home communication terminal.

5. The system according to claim 4, wherein some digital service packets further include code for manipulating the at least portion of the visual object.

6. The system according to claim 4 wherein the digital service packets are self-contained.

7. The system according to claim 4 wherein the selection of application code portions is responsive to an identity of media packets being provided to at least one end-user.

8. The system according to claim 4 wherein an digital home communication terminal controls a filtering process of media packets and controls a display visual objects in response to events that are initiated by an end-user.

9. The system according to claim 8 wherein the selection is responsive to the identity of filtered media packets.

10. The system according to claim 8 wherein an digital service packet group comprises digital service packets that allow for displaying a sequence of logically linked visual objects.

11. The system according to claim 8 wherein the digital home communication terminal is further configured to filter digital service packets allowing for a display of a selected visual object and for responding to events related to the display of the selected visual object.

12. The system according to claim 8 wherein the digital home communication terminal filters digital service packets is responsive to events that were previously initiated by an end-user.

13. A system for providing enhanced services, the system comprising:
   (a) a multiplexed sequence generator for generating a multiplexed digital sequence; the multiplexed digital sequence comprising a plurality of digital representations of analog programs; and
   (b) a transmitter, for transmitting the multiplexed digital sequence to a plurality of digital home communication terminals;
   wherein each digital home communication terminal has a display unit and wherein the digital home communication terminal is configured to allocate a first portion of the display unit to display a digital representation of an analog program out of the plurality of analog programs and allocate a second portion of the display unit to be utilized for digital service, in response to a selection of the digital service;
   wherein each digital home communication terminal comprises a tuner, and wherein the system is further configured to adjust digital service packets transmission parameters in response to a status of the tuner.

14. A system for providing enhanced services, the system comprising:
   (a) a multiplexed sequence generator for generating a multiplexed digital sequence; the multiplexed digital sequence comprising a plurality of digital representations of analog programs; and (b) a transmitter, for transmitting the multiplexed digital sequence to a plurality of digital home communication terminals;

wherein each digital home communication terminal has a display unit and wherein the digital home communication terminal is configured to allocate a first portion of the display unit to display a digital representation of an analog program out of the plurality of analog programs and allocate a second portion of the display unit to be utilized for digital service, in response to a selection of the digital service;

wherein each digital home communication terminal receives digital service packets and media packets via a tuner, and wherein the system is further configured to adjust digital service packets transmission parameters in response to a status of the tuner.

15. A system for providing enhanced services, the system comprising:

(a) a multiplexed sequence generator for generating a multiplexed digital sequence; the multiplexed digital sequence comprising a plurality of digital representations of analog programs;

(b) a transmitter, for transmitting the multiplexed digital sequence to a plurality of digital home communication terminals; wherein each digital home communication terminal has a display unit and wherein the digital home communication terminal is configured to allocate a first portion of the display unit to display a digital representation of an analog program out of the plurality of analog programs and allocate a second portion of the display unit to be utilized for digital service, in response to a selection of the digital service;

(c) a router, coupled between the multiplexed sequence generator, digital service providers and the transmitter, the router operative to receive digital service packets and digital multiplexed sequences, and to provide digital service packets and digital multiplexed sequence packets to digital home communication terminals; and (d) a session manager, coupled to the router, the session manager providing routing instructions to said router, for dynamically selecting digital service packets and digital multiplexed sequence packets out of the received digital service packets and digital multiplexed sequence packets.

16. The system according to claim 15, wherein some digital service packets further include code for manipulating the at least portion of the visual object.

17. The system of claim 15 wherein the router is further operable to receive media packets and the session manager is further operable to dynamically select media packets to be provided to digital home communication terminals.

18. The system according to claim 15 further comprising at least one media degradation unit, for compressing media packets.

19. The system according to claim 15 wherein at least some of the media signals and digital service packets are MPEG compliant.

20. The system according to claim 15 further comprising network transmitters for transmitting to each group of end-users group-associated digital service packets over a bandwidth limited media.

21. The system according to claim 15, further comprising a dynamic network restructuring unit, coupled to the network transmitters, for providing channel managing commands to each said network transmitters, receiving group-associated digital service packets from said router.

22. The system according to claim 15, wherein some of the digital service packets and some of the media packets are non-addressable packets, wherein some media packets are addressable packets, wherein the router comprising: a plurality of input ports, including at least one non-addressable stream input port; a plurality of non-addressable stream output ports; a multiple port switch, connected between said non-addressable stream input ports and said non-addressable stream output ports; said multiple port switch directing a non-addressable digital service packets and media packets, received from a selected one of said at least one non-addressable stream input ports, to at least a selected one of said at least one non-addressable stream output ports, said multiple port switch selecting said selected non-addressable stream output port according to the type and identity of said selected non-addressable stream input port and the identity information embedded in said non-addressable digital service packet.

23. The system according to claim 22, further comprising at least one addressable stream communication port, connected to said multiple port switch, said multiple port switch directing an addressable media packet, received from a selected one of said at least one addressable stream communication ports, to at least a selected one of said at least one non-addressable stream output ports.

24. The system according to claim 23, wherein the selected non-addressable stream output port encapsulates an addressable media packet in a non-addressable stream packet, when the addressable packet is received from one of said at least one addressable stream input ports.

25. The system according to claim 23, wherein MPEG transport packets are encapsulated into communication packets respective of the communication protocol of said multiple port switch.

26. The system according to claim 23, wherein said at least one non-addressable stream input port comprises a multiple program transport interface and wherein said at least one non-addressable stream output port comprises a multiple program transport interface.

27. The system according to claim 23, further comprising a plurality of stream processors, each said stream processor being connected between said multiple port switch and a respective one of said non-addressable stream output ports.

* * * * *